United States Patent [19]

Ichikawa et al.

[11] Patent Number: 5,356,681
[45] Date of Patent: Oct. 18, 1994

[54] MULTI-LAYER RUBBER HOSE AND METHOD FOR PRODUCING THE SAME

[75] Inventors: Masayoshi Ichikawa; Tomoaki Okita, both of Inazawa, Japan

[73] Assignee: Toyoda Gosei Co., Ltd., Nishikasugai, Japan

[21] Appl. No.: 43,019

[22] Filed: Apr. 5, 1993

[30] Foreign Application Priority Data

Apr. 8, 1992 [JP] Japan .................................. 4-086982

[51] Int. Cl.$^5$ .............................................. B29D 9/00
[52] U.S. Cl. ................................ 428/36.8; 428/36.9; 428/421; 428/492; 428/522; 138/137; 138/140; 138/DIG. 3
[58] Field of Search ...................... 428/36.9, 36.8, 421, 428/492, 522; 138/137, 140, DIG. 3

[56] References Cited

U.S. PATENT DOCUMENTS

| | | | |
|---|---|---|---|
| 4,606,952 | 8/1986 | Sugimoto et al. | 428/36 |
| 4,806,351 | 2/1989 | Sugimoto et al. | 428/421 |
| 4,975,139 | 12/1990 | Sugimoto | 156/307.1 |
| 4,988,548 | 1/1991 | Takemura et al. | 428/368 |

FOREIGN PATENT DOCUMENTS 61-242840 10/1986 Japan .

OTHER PUBLICATIONS

English Translation of JISK 6301-1975, pp. 20-22.

*Primary Examiner*—Ellis P. Robinson
*Assistant Examiner*—Michael A. Williamson
*Attorney, Agent, or Firm*—Cushman, Darby & Cushman

[57] ABSTRACT

A multi-layer rubber hose in which a fluorinated rubber (FKM) layer and a nitrile rubber (NBR) layer adjacent thereto have been vulcanization-adhered to each other. The FKM layer is formed from the vulcanizate of an FKM compound containing a ternary FKM as a polymer component. The vulcanization system is an organic polyol system and a quaternary ammonium salt, and the vulcanization induction time ($T_{10}$) satisfies the following equation, 4 minutes $\leq T_{10}+$determined vulcanization temperature $-170°$ C.) minutes/10° C.$\leq 7$ minutes. The NBR layer is formed from the vulcanizate of the NBR compound, and the NBR comound is a stock rubber into which a functional group having an active hydrogen has been introduced. The vulcanization system is an oragnic peroxide system. The multi-layer rubber hose of the presnt invention is suitable as a fuel hose for cars and has a high resistance to gasohol.

6 Claims, 1 Drawing Sheet

MULTI-LAYER RUBBER HOSE AND METHOD FOR PRODUCING THE SAME

BACKGROUND OF THE INVENTION

1. Field of the Invention

The present invention relates to a multi-layer rubber hose particularly suitable as a fuel hose for cars obtained by vulcanization-adhesion of a fluorinated rubber layer with a nitrile rubber layer and a method for producing the same.

2. Description of Related Art

The main abbreviations used herein are as follows:
FKM=fluorinated rubber
NBR=nitrile rubber
PVC=polyvinyl chloride
PHR=number of parts per 100 parts of a stock rubber (polymer)

The recent trend in fuels is increasing the use of alcohol-added gasoline as a car fuel for the purposes of effective utilization of petroleum resources, reduction of fuel cost and reduction of environmental pollution. The above alcohol-added gasoline (hereinafter gasohol) is obtained by adding methyl tert-butyl ether (MTBE) or an alcohol to gasoline.

NBR has been used as a material for an inner rubber lager of a fuel hose in contact with gasoline. However, NBR has an inferior resistance to the gasohol because the solubility parameter (SP value) of the gasohol is near that of NBR.

It has been proposed to form the inner rubber layer of fuel hoses with FKM which is superior to NBR in gasoline resistance and alcohol resistance, and also in physical properties such as temperature resistance, chemical resistance, ageing resistance, and the like. However, the cost of FKM is very expensive, typically 10 to 20 times that of the general-purpose rubbers such as NBR and the like, so that it is not practical to form the whole inner rubber layer with FKM.

Because of the high cost of FKM, it has been proposed to form a thin FKM layer on the inner surface of a NBR base layer of a fuel hose. It is difficult, however, to obtain good adhesion between the FKM layer and NBR layer by the known methods.

In order to solve this problem, various techniques have been proposed to vulcanization adhere the FKM layer to the NBR layer using a FKM compound and a NBR compound.

For example, U.S. Pat. No. 4,606,952 discloses a rubber laminate produced by vulcanization-adhesion of the FKM layer to the NBR layer. In this rubber laminate, the FKM layer comprises a FKM compound in which the vulcanization system is a polyol system using a quaternary ammonium salt as a vulcanization accelerator, and the NBR layer comprises a NBR compound obtained by compounding NBR, a stock rubber, into which a particular functional group having an active hydrogen has been introduced and an oxide of a metal selected from Groups II to IV of the periodic table.

Japanese Patent Applications Kokai No. 61-242840 and U.S. Pat. No. 4,806,351 disclose a rubber laminate produced according to-the above U.S. Pat. No. 4,606,952 except that the amount of the vulcanization accelerator in the FKM compound is specified and a general-purpose NBR (having no introduced function group) is used as the stock rubber.

In the above conventional multi-layer rubber hoses, a large initial interlaminar adhesive force between the FKM layer and NBR layer can be obtained. However, the interlaminar adhesive force decreases after being immersed in a gasohol (methanol-added gasoline).

SUMMARY OF THE INVENTION

In view of the above, an object of the invention is to provide a multi-layer rubber hose which has increased durability when used in gasohol and a method for producing the multi-layer rubber hose.

The invention is a multi-layer rubber hose in which a fluorinated rubber (FKM) layer and a nitrile rubber (NBR) layer adjacent thereto have been vulcanization adhered to each other, characterized in that the following requirements are satisfied. The FKM layer is formed from the vulcanizate of a FKM compound containing a ternary FKM as a polymer component. The vulcanization system comprises an organic polyol system and a quaternary ammonium salt, and the vulcanization induction time ($T_{10}$) satisfies the following equation, $$4 \text{ minutes} \leq T_{10} + (\text{determined vulcanization temperature} - 170°\text{ C.}) \text{ minutes}/10°\text{ C.} \leq 7 \text{ minutes}.$$

The NBR layer is formed from the vulcanizate of a NBR compound, and the NBR compound comprises a stock rubber into which a functional group having an active hydrogen has been introduced. The vulcanization system comprises an organic peroxide system.

PREFERRED EMBODIMENTS OF THE INVENTION

Figure 1:
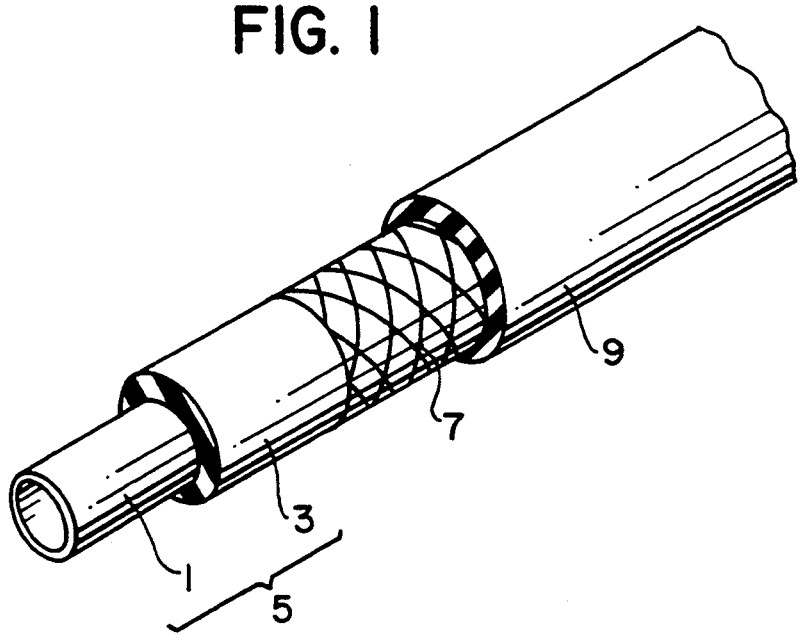
FIG. 1 is a perspective view of a rubber hose according to the invention.

The invention will be illustrated in detail with reference to the fuel hose shown in FIG. 1. However, the invention is not to be interpreted as being limited thereto. Unless otherwise stated, the unit of compounding is part by weight.

The fuel hose, as shown in FIG. 1, is produced by vulcanization-adhesion of the FKM layer (1) which is formed by extrusion-molding the FKM compound to the NBR layer (3) which is formed by extrusion-molding the NBR compound.

The FKM compound contains a ternary FKM as stock rubber, an organic polyol and a quaternary ammonium salt as vulcanizing agents and other subsidiary materials. Compounding the components is designed so that the vulcanization induction time ($T_{10}$) satisfies the following equation, $$4 \text{ minutes} \leq T_{10} + (\text{determined vulcanization temperature} - 170°\text{ C.}) \text{ minutes}/10°\text{ C.} \leq 7 \text{ minutes}.$$

An example of the ternary FKM includes fluorovinylidene/hexafluoropropylene/tetrafluoroethylene terpolymer.

An example of the organic polyol which can be used includes 2,2-bis (4'-hydroxyphenyl) propane, 2,2-bis (4'-hydroxyphenyl)hexafluoropropane, dihydroxybenzophenone, hydroquinone and the like. Of these, 2,2-bis (4'-hydroxyphenyl) hexafluoropropane is preferred.

An example of the quaternary ammonium salt which can be used includes octadecyltrimethylammonium bromide, octadecyltrimethylammonium chloride, octadecyltrimethylammonium chloridoiodide, triphenylbenzylammonium chloride, tetraphenylammonium chloride and the like.

Compounding is carried out by changing the type and amount of the vulcanizing agent so that the vulcanization induction time ($T_{10}$) satisfies the foregoing equation.

The amount of the organic polyol compounded is preferably 0.9 to 4.8 phr (i.e., parts per 100 parts of FKM). The amount of the quaternary ammonium salt compounded is preferably 0.1 to 1.1 phr.

The organic polyol is the largest factor determining crosslinking density. Because of this, when the amount of the organic polyol is less than 0.9 phr, it is difficult to obtain sufficient strength of the vulcanizate. When the amount exceeds 4.8 phr, the crosslinking density of the vulcanizate is too high to obtain sufficient flexibility required for the hose.

Other subsidiary materials include carbon black as a reinforcing agent, MgO and Ca(OH) as an acid-accepting agent, plasticizers, processing auxiliaries and the like.

The NBR compound contains the functional NBR below, an organic peroxide as a vulcanizing agent and other subsidiary materials.

The functional NBR refer, s to a stock NBR into which a functional group having an active hydrogen has been introduced. The functional group having an active hydrogen includes an amino group, an epoxy group, a carboxyl group, a hydroxyl group and the like. Specifically, those described in U.S. Pat. No. 4,606,952 can be used.

The functional NBR is obtained by copolymerizing a functional monomer having the above functional group with butadiene or isoprene, and acrylonitrile.

The amount of the functional monomer bonded in the functional NBR is preferably 0.5 to 20%.

When the amount of the functional NBR is less than 0.5%, it is difficult to obtain a sufficient initial interlaminar adhesive force wherein rubber fracture occurs before interfacial peeling occurs. When the amount exceeds 20%, the interlaminar adhesive force reaches saturation and can adversely effect the vulcanization property of NBR.

The amount of acrylonitrile bonded in the functional NBR is not critical, but it is preferably 15 to 55%, more preferably 30 to 40%, in order to provide oil resistance and cold resistance of the NBR layer.

It is also possible to improve the gasohol resistance of the NBR layer by polyblending 5 to 30% of PVC, based on the total of NBR and PVC, with the above functional NBR. When the amount of PVC is less than 5%, the gasohol resistance is not sufficiently improved, and when it exceeds 30%, resinous properties increase.

An example of the above organic peroxide includes dicumyl peroxide, 2,5-dimethyl-2,5-di(tert-butylperoxy)hexane, 2,5-dimethyl-2,5-di(tert-butylperoxy)hexyne-3, 1,1-bis(tert-butylperoxy)3,3,5-trimethylcyclohexane, tert-butyl peroxybenzoate and the like. The amount of the organic peroxide compounded is preferably 1 to 10 phr.

The organic peroxides are preferably used together with co-crosslinking agents such as triallyl isocyanurate and the like. The amount of the co-crosslinking agent compounded is preferably 1 to 5 phr.

It is desirable to compound the above NBR compound and the oxide or hydroxide of a metal selected from Groups II to IV of the periodic table (hereinafter referred generically to as "metal oxides").

The metal oxides include magnesium oxide, aluminum oxide, zinc oxide, zinc dioxide, calcium oxide, lead oxide (II, IV), silicon dioxide and hydroxides derived from these oxides. Among these, magnesium oxide, calcium hydroxide, aluminum hydroxide and lead oxide (II) are particularly preferred.

The amount of the metal oxides compounded is preferably 5 to 50 phr. When the amount is less than 5 phr, the interlaminar adhesive force between the NBR layer and FKM layer is not sufficiently improved. If the amount exceeds 50 phr, the interlaminar adhesive force reaches saturation and can adversely effect the physical properties of the vulcanized rubber.

The other subsidiary materials described above include, in addition to the above metal oxides, carbon black as a reinforcing agent, zinc white as a vulcanization auxiliary, plasticizers, lubricants, processing auxiliaries and the like.

When a rubber hose, for example, as shown in FIG. 1 is produced, an inner rubber layer (5) is first formed by co-extruding the FKM compound for forming the inner layer (FKM layer) (1) of the inner rubber layer (5) and the NBR compound for forming the outer layer (NBR layer) (3) of the layer (5), or separately extruding each of the NBR compound and FKM compound. A reinforcing yarn layer (7) is then formed on the inner rubber layer (5) by means of a spiral, after which an outer rubber layer (9) is formed on the reinforcing yarn layer (7) by extrusion.

The outer rubber layer (9) can be, for example, chlorohydrin rubber, chlorosulfonated polyethylene, chloroprene rubber or the like.

The unvulcanized multi-layer rubber hose thus produced is continuously or batchwise vulcanized at about 150° to 180° C. for about 5 to 90 minutes, so that the foregoing equation is satisfied. Thus, the FKM layer (1) and NBR layer (3) are vulcanization-adhered to each other.

The reinforcing yarn is usually treated with adhesives such as a resorcinol-formalin latex (RFL) to increase adhesion between the reinforcing yarn layer (7) and both the inner rubber layer (5) and outer rubber layer (9).

The thickness of the FKM and NBR layers, when they form a fuel hose, are preferably 0.4 to 2.0 mm for the former and 0.4 to 4.0 mm for the latter.

The multi-layer rubber hose of the invention is not limited to one shown in FIG. 1. For example, there can be multi-layer rubber hoses having no reinforcing yarn layer, those comprising the inner and outer layers made of FKM, and the like.

Vulcanization of the rubber hose is preferably carried out in a state wherein a mandral has been inserted into the inner rubber tube.

The multi-layer rubber hose exhibits almost no reduction in the interlaminar adhesive force after immersion in the gasohol- The multi-layer rubber hose is durable for many years when used as a fuel hose for the gasohol.

Before this invention, the vulcanization induction time ($T_{10}$) of the ternary FKM in the vulcanization system of a polyol was determined to be about 3 minutes when the heating temperature was 170° C., by those skilled in the art.

EXAMPLES

First, vulcanization curves were prepared by heat-treating the FKM compounds and NBR compounds shown in Tables 1 and 2 at 170° C. for 20 minutes using a curelastometer (Curelast Model III produced by Nippon Synthetic Rubber Co., Ltd.). The vulcanization induction time ($T_{10}$) and proper vulcanization time ($T_{90}$) of every compound were obtained on the basis of the vulcanization curves. The terms "vulcanization induction time ($T_{10}$)" and "proper vulcanization time ($T_{90}$)" refer to times at which the test sample during vulcanization shows values of 10% and 90%, respecively, of the difference between the maximum torque and minimum torque which are obtained from the vulcanization curve. $T_{10}$ and a relative vulcanization rate ($T_{90}$-$T_{10}$) are shown in Tables 1-and 2.

Table 1 shows that $T_{10}$ (vulcanization temperature, 170° C.) of F-1 to F-6 used in the invention (Examples) is in the range of 4 to 7 minutes, and that of F-7 to F-10 used in the comparative Examples is outside the above range.

Every compound shown in Table 1 was milled on a roll into a sheet of 3 mm in thickness to obtain the FKM sheet. In the same manner as above, every compound shown in Table 2 was milled to obtain the NBR sheet of the same thickness. The FKM sheet and NBR sheet were combined as shown in Tables 3 and 4, and were laid one upon another and vulcanized under pressure of 100 kgf/cm$^2$ at 170° C. for 20 minutes. Every rubber laminate obtained was cut into test pieces. Using these test pieces, the initial interlaminar adhesive force and interlaminar adhesive force after immersion in the gasohol were measured according to the "Peeling Test" described in JIS K 6301. The gasohol immersion test was carried out using the test piece pre-treated as follows: The test piece was immersed in a gasohol, a Fuel C/methanol (85/15) mixture, in which Fuel C means a mixture of toluene/isooctane (50/50 vol %), at 40° C. for 48 hours, taken out of the gashool, allowed to stand at room temperature for 1 day vacuum-dried at 760 mmHg and then tested.

The results in Table 3 show that Examples 1 to 6 satisfy the requirements of the invention. The initial interlaminar adhesive force remains the same after the gasohol immersion test and no interfacial peeling occurs.

As can be seen from the results of F-1, F-2, F-3 and F-4, the adhesive strength is insignificantly affected even if the relative vulcanization rate is changed. That is, a wide range of the vulcanization rates can be selected, which is advantageous in controlling production.

In contrast, the results of Table 4 show that Comparative Examples 1 to 4 do not satisfy the requirements of the invention. The initial interlaminar adhesive force is sufficient wherein rubber fracture occurs before interfacial peeling occurs. However, after the gasohol immersion test, interfacial peeling occurs at a value less than 5 kgf/2.54 cm.

In Example 3 using a typeical FKM (F-3), the vulcanization characteristics and adhesive strength at temperatures of 160° C. and 180° C. were measured according to the method described above. The results are shown in Table 5.

From the results of Table 5, when the heating temperature (vulcanization temperature) is shifted low and high with 170° C. as a standard, the measurement values difine the following equation, $$4 \text{ minutes} \leqq T_{10} + (\text{determined vulcanization temperature} - 170° \text{C.}) \text{ minutes}/10° \text{C.} \leqq 7 \text{ minutes}$$

Furthermore, the results of the adhesive strength test show that even if the vulcanization temperature is shifted low and high with 170° C. as a standard, the adhesion property is good both at the initial stage and after immersion in the gasohol, as long as the above equation is satisfied.

While the invention has been described in detail and with reference to specific embodiments thereof, it is apparent to one skilled in the art that various changes and modifications can be made therein without departing from the spirit and scope thereof.

TABLE 1

|  |  | F-1 | F-2 | F-3 | F-4 | F-5 | F-6 | F-7 | F-8 | F-9 | F-10 |
|---|---|---|---|---|---|---|---|---|---|---|---|
| Composition of Compounding (phr) | Ternary *1 FKM | 100 | 100 | 100 | 100 | 100 | 100 | 100 | 100 | 100 | 100 |
|  | Organic *2 polyol | 3.5 | 2.0 | 4.7 | 3.5 | 2.0 | 2.5 | 2.5 | 5.0 | 2.5 | 0.8 |
|  | Quaternary ammonium salt | 1.0 | 1.1 | 1.1 | 0.2 | 0.6 | 0.8 | 1.2 | 0.2 | 0.08 | 0.8 |
|  | Carbon (SRF) | 15 | 15 | 15 | 15 | 15 | 15 | 15 | 15 | 15 | 15 |
|  | MgO | 5 | 5 | 5 | 5 | 5 | 5 | 5 | 5 | 5 | 5 |
|  | Ca(OH)$_2$ | 10 | 10 | 10 | 10 | 10 | 10 | 10 | 10 | 10 | 10 |
| Vulcanization characteristics | $T_{10}$ (min) | 4.9 | 4.8 | 5.4 | 5.9 | 6.7 | 6.6 | 3.3 | 3.4 | 7.7 | 10.6 |
|  | $T_{10}$-$T_{90}$ (min) | 2.0 | 4.0 | 1.8 | 2.5 | 2.2 | 2.6 | 1.9 | 0.5 | 4.1 | 3.4 |

*1 Produced by Sumitomo Three M Co., Ltd.
*2 Bisphenol A

TABLE 2

|  |  |  | N-1 | N-2 |
|---|---|---|---|---|
| Polymer (phr) | Stock rubber | Butadiene | 55 | 47 |
|  |  | Acrylonitrile | 37 | 31 |
|  |  | Functional *1 monomer | 8 | 7 |
|  |  | PVC |  | 15 |
| Carbon (MAF) (phr) |  |  | 40 | 40 |
| Stearic acid (phr) |  |  | 1 | 1 |
| Zinc oxide (phr) |  |  | 5 | 5 |
| Ca(OH)$_2$ (phr) |  |  | 20 | 20 |
| Triallyl isocyanurate (phr) |  |  | 3 | 3 |
| Organic peroxide *2 (phr) |  |  | 6 | 6 |
| Vulcanization characteristics | $T_{10}$ (min) |  | 1.1 | 1.2 |
|  | $T_{90}$-$T_{10}$ (min) |  | 15.0 | 16.3 |

*1 DEMA (diethylaminoethyl acrylate)
*2 A chemical containing 40% of 2,5-dimethyl-2,5-di(tert-butylperoxy)hexane and 60% of inorganic filler such as calcium carbonate, hydrous silicic acid.

TABLE 3

| | | Example | | | | | |
|---|---|---|---|---|---|---|---|
| | | 1 | 2 | 3 | 4 | 5 | 6 |
| Laminate | FKM layer | F-1 | F-2 | F-3 | F-4 | F-5 | F-6 |
| | NBR layer | N-2 | N-1 | N-2 | N-1 | N-1 | N-1 |
| Adhesive strength | Initial stage (kgf/2.54 cm) | 8.7 O | 9.6 O | 10.5 O | 9.2 O | 10.9 O | 11.5 O |
| | After immersion in gasohol (kgf/2.54 cm) | 8.7 O | 9.6 O | 10.5 O | 9.2 O | 10.9 O | 11.5 O |

O Rubber fracture

TABLE 4

| | | Comparative Example | | | |
|---|---|---|---|---|---|
| | | 1 | 2 | 3 | 4 |
| Laminate | FKM layer | F-7 | F-8 | F-9 | F-10 |
| | NBR layer | N-1 | N-1 | N-1 | N-1 |
| Adhesive stregnth | Initial stage (kgf/2.54 cm) | 14.2 O | 14.3 O | 10.8 O | 16.0 O |
| | After immersion in gasohol (kgf/2.54 cm) | 3.3 X | 4.3 X | 2.1 X | 3.5 X |

O Rubber fracture
X Interfacial peeling

TABLE 5

| FKM used | F-3 | | F-3 | |
|---|---|---|---|---|
| Heating condition | 160° C. × 60 min | | 180° C. × 20 min | |
| Vulcanization characteristics of FKM | | | | |
| $T_{10}$ | 6.9 | | 4.7 | |
| $T_{90}-T_{10}$ | 2.5 | | 0.9 | |
| Vulcanization condition | 160° C. × 60 min | | 180° C. × 20 min | |
| Initial stage (kgf/2.54 cm) | 10.2 | O | 9.8 | O |
| After immersion in gasohol (kfg/2.54 cm) | 9.5 | O | 8.9 | O |

O Rubber fracture

What is claimed is:

1. A multi-layer rubber hose resistant to gasohol comprising:

a fluorinate rubber layer comprising a vulcanizate of a fluorinated rubber compound containing a ternary fluorinated rubber as a polymer component, and a vulcanization system comprising an organic polyol system and a quaternary ammonium salt, the organic polyol being present in the amount of about 0.9 to about 4.8 parts per 100 parts of the ternary fluorinated rubber, a vulcanization induction time ($T_{10}$) satisfying the equation, 4 minutes $\leq T_{10}+$(vulcanization temperature $-170°$ C.) minutes/10° C.$\leq 7$ minutes; and a nitrile rubber layer adhered to said fluorinated rubber layer comprising a vulcanizate of a nitrile rubber compound containing a bonded functional monomer in the amount of 0.5–20% in which there is a functional group having an active hydrogen, about 5 to 30% by weight of polyvinyl chloride based on the amount of the nitrile rubber and polyvinyl chloride, a co-crosslinking agent and a vulcanization system comprising an organic peroxide system.

2. The multi-layer hose according to claim 1, wherein the quaternary ammonim salt is present in the amount of about 0.1 to about 1.1 parts per 100 parts of rubber.

3. The multi-layer hose according to claim 1, wherein the organic peroxide is present in the amount of about 1 to about 5 parts per 100 parts of rubber.

4. The multi-layer hose according to claim 1, wherein a metal oxide is compounded into the nitrile rubber layer.

5. The multi-layer hose according to claim 4, wherein the metal oxide is present in the amount of about 5 to about 50 parts per 100 parts of rubber.

6. The multi-layer hose according to claim 1, further comprising subsidiary materials selected from the group consisting of reinforcing agents, acid-accepting agents, plasticizers, and processing auxiliaries.

* * * * *